United States Patent
Schilling

(10) Patent No.: US 8,432,047 B2
(45) Date of Patent: Apr. 30, 2013

(54) DEVICE FOR CONVERSION OF THERMODYNAMIC ENERGY INTO ELECTRICAL ENERGY

(75) Inventor: Gerhard Schilling, Schrobenhausen (DE)

(73) Assignee: Dynatronic GmbH, Schrobenhausen (DE)

( * ) Notice: Subject to any disclaimer, the term of this patent is extended or adjusted under 35 U.S.C. 154(b) by 603 days.

(21) Appl. No.: 12/517,035

(22) PCT Filed: Nov. 29, 2007

(86) PCT No.: PCT/EP2007/010368
§ 371 (c)(1),
(2), (4) Date: Dec. 18, 2009

(87) PCT Pub. No.: WO2008/064889
PCT Pub. Date: Jun. 5, 2008

(65) Prior Publication Data
US 2010/0283263 A1    Nov. 11, 2010

(30) Foreign Application Priority Data
Nov. 29, 2006 (DE) .......................... 10 2006 056 349

(51) Int. Cl.
| F02B 63/04 | (2006.01) |
| F03G 7/08 | (2006.01) |
| H02K 7/18 | (2006.01) |
| F01B 29/10 | (2006.01) |
| F02G 1/04 | (2006.01) |
| F02B 71/00 | (2006.01) |

(52) U.S. Cl.
USPC .......................... 290/1 R; 60/517; 123/46 E

(58) Field of Classification Search ................... 290/1 R; 123/46 E; 60/517
See application file for complete search history.

(56) References Cited

U.S. PATENT DOCUMENTS

| 3,105,153 | A | * | 9/1963 | James, Jr. ...................... 290/1 R |
| 3,675,031 | A | * | 7/1972 | Lavigne ........................ 290/1 R |
| 4,454,426 | A | * | 6/1984 | Benson ......................... 290/1 R |
| 4,480,599 | A | * | 11/1984 | Allais ........................... 123/46 R |
| 4,484,082 | A |   | 11/1984 | Bucknam ...................... 290/1 R |
| 4,511,805 | A | * | 4/1985 | Boy-Marcotte et al. ........... 290/2 |
| 4,532,431 | A | * | 7/1985 | Iliev et al. ..................... 290/4 R |
| 4,649,283 | A | * | 3/1987 | Berchowitz et al. .......... 290/1 R |
| 6,381,958 | B1 | * | 5/2002 | Kamen et al. ................... 60/517 |

(Continued)

FOREIGN PATENT DOCUMENTS

| DE | 4219498 | 12/1993 |
| DE | 4243401 | 6/1994 |

(Continued)

*Primary Examiner* — Pedro J Cuevas
(74) *Attorney, Agent, or Firm* — Carlson, Gaskey & Olds, PC

(57) ABSTRACT

A device for conversion of thermodynamic energy into electrical energy includes a piston/cylinder unit (16), a generator (18), and a controller (14). The piston/cylinder unit (16) includes a pressure cylinder (24) and a piston (26) arranged in the pressure cylinder (24) and linearly movable by a change in volume of a working medium. The generator (18) includes a coil (22) and a magnet (20). The magnet (20) is coupled to the piston (26) such that a linear movement of the piston (26) effects a linear movement of the magnet (20) within the coil (22). The controller (14) controls the working stroke of the device as a function of at least one measured process parameter.

20 Claims, 3 Drawing Sheets

U.S. PATENT DOCUMENTS

| | | | |
|---|---|---|---|
| 6,484,498 B1* | 11/2002 | Bonar, II | 60/517 |
| 6,809,486 B2* | 10/2004 | Qiu et al. | 318/135 |
| 6,876,094 B2* | 4/2005 | Jacobsen | 290/1 R |
| 6,932,030 B2* | 8/2005 | Perlo et al. | 123/46 R |
| 6,933,629 B2* | 8/2005 | Qiu et al. | 310/34 |
| 7,082,909 B2* | 8/2006 | Graf et al. | 123/46 E |
| 7,152,404 B2* | 12/2006 | Francois et al. | 60/525 |
| 7,200,994 B2* | 4/2007 | Chertok | 60/518 |
| 7,453,241 B2* | 11/2008 | Keiter et al. | 322/28 |
| 7,492,052 B2* | 2/2009 | Stumm | 290/2 |
| 7,622,814 B2* | 11/2009 | Hyde et al. | 290/1 R |
| 7,633,173 B2* | 12/2009 | Keiter et al. | 290/40 R |
| 7,777,357 B2* | 8/2010 | Hyde et al. | 290/1 A |
| 7,856,714 B2* | 12/2010 | Hyde et al. | 29/888.011 |
| 7,950,356 B2* | 5/2011 | Hyde et al. | 123/46 R |
| 8,037,852 B2* | 10/2011 | Hyde et al. | 123/46 E |
| 8,091,519 B2* | 1/2012 | Bennion | 123/51 R |
| 8,096,118 B2* | 1/2012 | Williams | 60/519 |
| 8,125,093 B2* | 2/2012 | Hyde et al. | 290/1 R |
| 8,151,745 B2* | 4/2012 | Hyde et al. | 123/46 E |
| 2002/0121816 A1* | 9/2002 | Qiu et al. | 310/51 |
| 2002/0175520 A1* | 11/2002 | Jacobsen | 290/1 R |
| 2005/0082994 A1* | 4/2005 | Qiu et al. | 318/128 |
| 2006/0048510 A1* | 3/2006 | White et al. | 60/520 |
| 2007/0261677 A1* | 11/2007 | Bennion | 123/51 R |
| 2008/0122408 A1* | 5/2008 | Keiter et al. | 322/28 |
| 2010/0192566 A1* | 8/2010 | Williams | 60/517 |
| 2011/0101119 A1* | 5/2011 | Schilling | 237/12.1 |
| 2011/0221206 A1* | 9/2011 | Milinkovic et al. | 290/1 R |
| 2011/0252780 A1* | 10/2011 | Takeuchi | 60/525 |
| 2011/0271676 A1* | 11/2011 | Walpita et al. | 60/651 |
| 2011/0316359 A1* | 12/2011 | McDaniel et al. | 310/15 |
| 2012/0112468 A1* | 5/2012 | Najt et al. | 290/1 A |
| 2012/0125288 A1* | 5/2012 | Simpson et al. | 123/27 R |
| 2012/0125291 A1* | 5/2012 | Simpson et al. | 123/46 E |
| 2012/0126544 A1* | 5/2012 | Simpson et al. | 290/1 A |
| 2012/0227925 A1* | 9/2012 | Sweeney | 165/10 |
| 2012/0235517 A1* | 9/2012 | Simpson et al. | 310/28 |

FOREIGN PATENT DOCUMENTS

| | | |
|---|---|---|
| DE | 19943993 A1 | 3/2001 |
| EM | 1398863 A | 3/2004 |
| JP | 2005318708 | 11/2005 |
| SE | WO2004/025098 | 3/2004 |

* cited by examiner

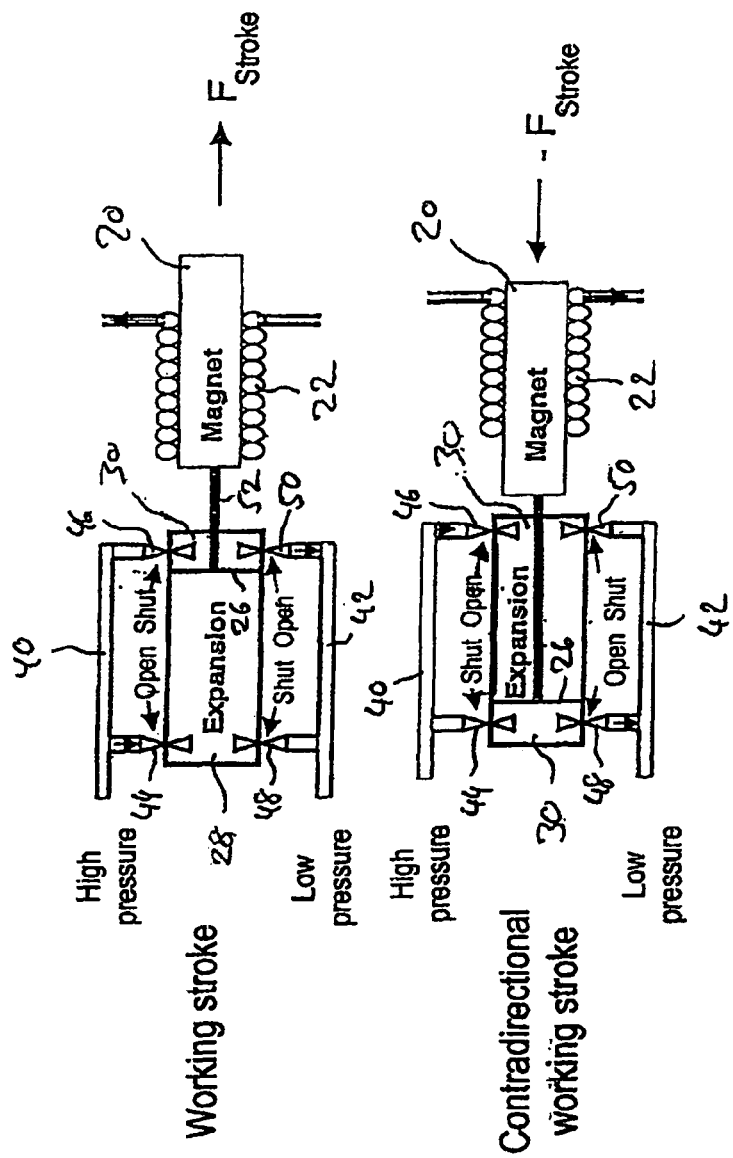

US 8,432,047 B2

DEVICE FOR CONVERSION OF THERMODYNAMIC ENERGY INTO ELECTRICAL ENERGY

CROSS-REFERENCE TO RELATED APPLICATIONS

This application is the United States National Stage of Patent Cooperation Treaty Application No. PCT/EP2007/010368 filed on Nov. 29, 2007, which claims priority to German Patent Application 10-2005-056-349.2 filed on Nov. 29, 2006, the disclosures of which are incorporated herein by reference in their entireties.

BACKGROUND OF THE INVENTION

The present general inventive concept relates to a device for conversion of thermodynamic energy into electrical energy.

There is a large variety of ways of generating electric power from mechanical energy of motion involving different efficiencies. In most cases, generators are used which transform a rotary motion. However, such periodically operating machines achieve an acceptable efficiency only as of a specific minimum frequency (rotational speed). When the energy supply is not constant, the conversion of energy is inefficient. A decrease in the supply of energy results in lower rotational speeds which are outside of the optimum operating range of the machine. This is often compensated for by transmissions, which, however, results in a reduction of the overall efficiency and in higher costs. Switching the machine off and on again does not satisfactorily solve this problem because of the associated losses.

A totally different approach for the generation of power from energy of motion is found in the publication: H. Polinder, M. E. C. Damen, F. Gardner, "Design, modeling and test results of the AWS PM linear generator"; in European Transactions on Electrical Power, 2005 (vol. 15), pp. 245-256. In this concept, the pressure originating from ocean waves is converted into mechanical energy of motion and transformed into electric power with the aid of a linear generator. But in this case too, the efficiency is most likely subject to strong fluctuations in particular in the conversion of pressure into motion, due to the non-constant supply of energy. The working cycle of the device is imposed by the natural wave formation and wave motion and can not be varied. In addition, the high demands on the dimensional relationships of the pressure cylinder used and of the linear generator as caused by the dynamic wave motions are assumed to result in a lower total energy transformation efficiency.

A further problem resides in that irregular voltage pulses generated by a linear generator (individual sporadic pulses of different amplitudes and durations) are not suitable for feeding into an electric power grid. Until now, this problem has been solved by first converting the voltage pulses into a direct voltage. For feeding into an electric power grid, this direct voltage is converted into a suitable alternating voltage by a grid-synchronous inverter. These measures, however, turn out to be very involved and are difficult to put to practice on a large scale. In addition, this type of conversion has an adverse effect on the efficiency. An alternative solution provides for the generation of rotational energy from the voltage pulses. A subsequent transformation and inversion of the output voltage results in an alternating voltage suitable for feeding. In this case too, the relatively high expenditure and the inevitable losses are disadvantageous.

SUMMARY OF THE INVENTION

It is the object of the present general inventive concept to provide a low cost device for generating electric power which is as simply structured as possible and which operates exclusively at a high efficiency.

To achieve this object, a device is proposed which has a piston/cylinder unit which includes a pressure cylinder and a piston that is arranged in the pressure cylinder and is linearly movable by a change in volume of a working medium, a generator which includes a coil and a magnet, the magnet or the coil being coupled to the piston such that a linear movement of the piston effects a linear movement of the magnet relative to the coil, and a controller which controls a working stroke of the device as a function of at least one measured process parameter. The operation of the device according to the present general inventive concept is not subject to any periodic working cycle, but is based on a controlled sequence of individual working strokes, so that each working stroke can proceed with optimum energy conversion efficiency. On the basis of a continuous evaluation of the measured process parameter, the controller specifies the time sequence of the equivalent working strokes. In comparison with periodically operating machines, such as, e.g., known two-stroke engines (Stelzer engine, Stirling engine), the working stroke length is not proportional to the cycle frequency. In the ideal case, in the device according to the present general inventive concept the energy conversion process is always performed with the same efficiency, irrespective of how many times it is carried out per unit of time.

Advantageous and expedient further developments of the device according to the present general inventive concept are specified in the dependent claims.

BRIEF DESCRIPTION OF THE DRAWINGS

These and/or other aspects and advantages of the present general inventive concept will be apparent and more readily appreciated from the following description of the embodiments and from the accompanying drawings, to which reference is made and in which:

FIG. 2 illustrates a schematic structure of a linear part of a system in a first operating position according to an embodiment of the present general inventive concept;

FIG. 3 illustrates a schematic structure of a linear part in a second working position according to an embodiment of the present general inventive concept.

DETAILED DESCRIPTION OF THE PREFERRED EMBODIMENTS

Figure 1:
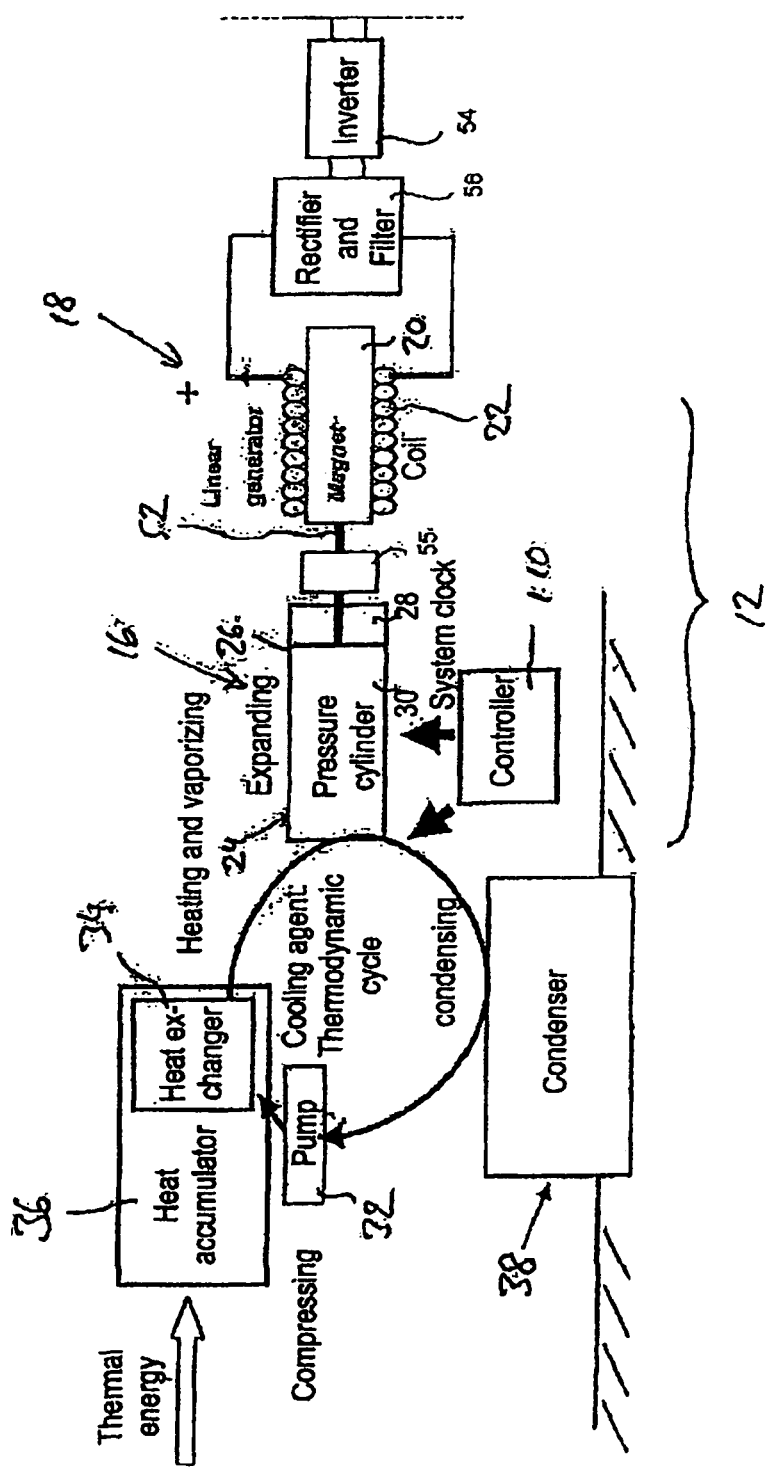
FIG. 1 illustrates a schematic structure of a system for generating electric power according to an embodiment of the present general inventive concept.

The present general inventive concept will be described below, taking a system for generating electric power as an example. The system illustrated in FIG. 1 comprises a thermodynamic part 10 having a working medium and a linear part 12 and a controller 14 acting on both parts.

The main components included in the linear part 12 (see also FIGS. 2 and 3) are, on the one hand, a single-stroke "engine" having a linear expansion means in the form of a piston/cylinder unit 16 and, on the other hand, a linear generator 18 having a magnet 20 and a coil 22. The piston/cylinder unit 16 essentially consists of a pressure cylinder 24 and a piston 26 which is displaceable therein and is coupled to the magnet 20 of the linear generator 18. A first working chamber 28 of the pressure cylinder 24 is formed on the side of the piston 26 facing away from the magnet 20, and a second working chamber 30 is formed on the side of the piston 26 facing the magnet 20.

The main components of the thermodynamic part 10 are essentially constituted by a pump 32, a heat exchanger 34, an optional heat accumulator 36, and a condenser 38. FIGS. 2 and 3 illustrate that the thermodynamic part 10 of the system is coupled to the linear part 12, more precisely to the single-stroke engine by means of two ducts 40, 42. The two ducts 40, 42, which are connected to the heat exchanger 34 (or more generally to a heat reservoir of higher temperature) and to the condenser 38 (or more generally to a heat reservoir of lower temperature), respectively, lead to the two variable working chambers 28, 30, respectively, of the pressure cylinder 24. The four ports 44, 46, 48, 50 coupling the ducts 40, 42 to the working chambers 28, 30 may be selectively opened or closed by the controller 14.

The mode of operation of the entire system will now be described below. Basically, the system operates according to the following principle: At first, thermal energy (heat energy) is converted into thermodynamic energy (steam pressure) in a thermodynamic cycle. The steam pressure is transformed into mechanical energy of motion (kinetic energy) in the single-stroke engine. The energy of motion is finally transformed into electrical energy by means of the linear generator 18.

The working medium is heated by supplying thermal energy and vaporizes, which leads to a strong expansion in volume of the working medium. For the heat exchanger 34, solar panels are used, for example, which absorb heat by insolation and give it off to the working medium which flows past and vaporizes due to being heated. When a cooling agent is used as the working medium having a lower boiling point than water, an estimated efficiency of $\eta > 20\%$ is achievable for this partial process. The contraction in volume of the working medium by cooling and condensation, which is required for the cyclic process, is effected in the condenser 38 in colder surroundings. The liquid working medium is compressed by means of the pump 32 and supplied to the heat exchanger 34 again.

In particular when an ORC process (Organic Rankine Cycle) is provided as thermodynamic cycle, the working medium employed is preferably a medium suitable for use in such an ORC process, e.g., R245fa or a synthetic working medium which is specially designed for the application described and which has good thermal transfer characteristics and also distinguishes itself in that in the working medium no partial vacuum is produced in relation to the ambient pressure in the required ORC temperature range, since the ORC efficiency is reduced due to air penetrating because of a partial vacuum, which is difficult to avoid technically in the long run. Furthermore, prior to expansion only a superheating of the vaporized gas which is as low as possible should be necessary since the energy added during superheating only slightly raises the ORC energy yield.

The heating/vaporization of the working medium is time-independent as related to the overall process and is not subject to any permanent minimum requirements. Basically, a cyclic process which is only based on heating and cooling of the working medium (without vaporizing and condensing) is also conceivable; in this case, however, the overall efficiency would be distinctly lower. Basically, other fluids such as, e.g. hydraulic oil, or gases may also be used as the working medium for the thermodynamic part 10.

As illustrated in FIG. 2, from the higher temperature heat reservoir, the expanding working medium reaches the first working chamber 28 of the pressure cylinder 24 via the first duct 40. To this end, the controller 14 opens the port 44 and closes the port 46. At the same time, the controller 14 closes the port 48 of the second duct and opens the port 50. This exerts a force $F_{stroke}$ on the piston 26, which results in a movement of the piston 26 to the right (according to the illustration in the Figures), with work being performed. This process, which terminates after a relatively large stroke of the piston 26, constitutes a "normal" working stroke of the engine.

The regulation of the volume (intake volume) flowing into the working chamber 28 as realized by means of the controller 14 as a function of the available medium pressure or the usable volume of expansion allows a very high efficiency in the conversion of the thermodynamic energy into mechanical energy of motion at an estimated efficiency of roughly $\eta=95\%$. The very high efficiency is also enhanced by the use of a smoothly running piston/cylinder unit 16 optimized for the above-mentioned requirements and having low frictional and low thermal losses, so that high expansion speeds can be realized.

Along with the piston 26, the magnet 20, directly coupled by means of a rigid piston rod 52, of the linear generator 18 moves within the coil 22, so that a voltage pulse is induced within the coil 22. Thus, no provision is made for a prior conversion of the linear piston movement into a rotary motion, for which reason the conversion into electrical energy by means of the linear generator 18 is very efficient at an estimated efficiency of roughly $\eta=90\%$. As illustrated in FIG. 1, the magnet 20 may also be connected to the piston 26 by means of a joint 55. The joint 55 absorbs transverse forces which are caused by mounting tolerances. In fact, a linear motion in the pressure cylinder 24 and in the linear generator 18 on precisely one axis is possible only theoretically.

FIG. 3 illustrates the contradirectional working stroke following the working stroke described above. The controller 14 closes the open ports 44, 50 and opens the closed ports 46, 48, so that an oppositely directed piston force $-F_{stroke}$ and a movement of the piston 26 to the left is produced. This results in a voltage pulse of opposite sign.

The two previously described working strokes are totally independent of each other (in particular in terms of time); that is, no periodic stroke sequence fixed in advance is provided as in the case of known multi-stroke engines. Rather, an individual working stroke is initiated depending on the situation, i.e. only if specific criteria are satisfied (particularly a sufficient pressure of the working medium) does the controller 14 provide for carrying out a working stroke by opening and, respectively, closing the ports 44, 46, 48, 50. It depends on the current position of the piston 26 which one of the two working strokes (normal or contradirectional) is carried out.

The special feature in operating the piston/cylinder unit 16 employing the working medium provided by the thermodynamic part 10 of the system resides in that the controller 14 knows the pressure of the working medium both in the higher temperature heat reservoir and in the lower temperature heat reservoir and initiates a working stroke only when the pressure differential between the two heat reservoirs is so great that the lower heat reservoir is able to receive the quantity, ejected in a full piston stroke, of the working medium located in the working chamber 28 (normal working stroke) or 30 (contradirectional working stroke). This ensures that always the full piston stroke is utilized, which enhances the efficiency in the conversion of the mechanical energy of motion into electrical energy as described later.

The dimensions of the piston stroke and the piston surface of the piston/cylinder unit 16 and the dimensions of the magnet 20 and the coil 22 of the linear generator 18 are matched with each other. With regard to the amounts of energy to be transferred and the overall energy transfer efficiency, it has turned out that a piston/cylinder unit 16 having a comparatively large stroke (long stroke cylinder) is suited best.

A special form of the linear generator 18, which may also be functionally modeled on a combination of a crankshaft and a rotating generator that is loss-free during start-up and shutdown, such as, e.g., the RMT generator, makes provision that upon each stroke in the pressure cylinder 24, a rotor of the rotating generator performs a rotation of 180 degrees and remains in this position until the contradirectional working stroke is carried out owing to a process criteria that has been satisfied and the rotor is then either rotated further as far as to the initial position or is rotated back.

As already indicated, the thermodynamic cycle and the single-stroke engine are controlled using a multitude of suitable sensors (pressure, temperature, filling level sensors, etc.) and the controller 14, which may include a plurality of subordinate controlling means. The controller 14 continuously monitors the overall situation taking into consideration all relevant process influencing variables (thermal energy supply, pressure and temperature of the working medium and of the surroundings, filling levels, etc.). For achieving an optimum overall efficiency, the controller 14 performs a variety of process controls such as, e.g., adjustments of the filling levels, velocities of flow of the working medium, amount of energy/volume of expansion of a working stroke, stroke frequency, size of the stroke, stroke length, etc. Under certain circumstances, the controller 14 may discontinue the energy conversion process altogether if, based on the sensor data, it may be expected that this will lead to a higher overall energy conversion efficiency.

An essential advantage of the system according to the present general inventive concept will be apparent from the following consideration. When the thermal energy supply is low, the theoretically possible efficiency in the thermodynamic conversion of thermal energy into mechanical energy is reduced by the Carnot efficiency:

$$\eta_{Carnot} = 1 - T_{OUT}/T_{IN},$$

with $T_{IN}$: temperature of the working medium in the higher temperature heat reservoir, and $T_{OUT}$: temperature of the working medium in the lower temperature heat reservoir.

A reduction in the flow velocity of the working medium in the solar panels as caused by the controller 14 results in higher $T_{IN}$ and in lower rates of flow per unit of time. By a combination of a reduction in the flow velocity and a reduction in the clock frequency of the situation-controlled linear generator 18, it is thus achieved that even in case of a low thermal energy supply the overall efficiency of the conversion of thermal into electrical energy remains constant.

The optional, thermally insulated heat accumulator 36 (pressure accumulator) of the thermodynamic part 10 of the system is adapted to (intermediately) store heated/vaporized working medium over a longer period of time. This is useful in particular in the case of a non-uniform thermal energy supply (e.g. in the case of a varying insulation) and, to a certain extent, allows an energy conversion that is independent of the period of time of the thermal energy supply without any substantial deterioration in the efficiency. In this way, in particular minimum start-up quantities may be ensured in order to permit a timing with respect to the working strokes of the pressure cylinder over a minimum period of time in this manner. A further development of the thermodynamic part 10 of the system provides for the use of a plurality of working media (cooling agents) having different boiling temperatures. Depending on the instantaneously maximum attainable temperature of the medium, the different boiling temperatures of the cooling agents allow the cooling agent or the mixture of two (or more) cooling agents to be used by which instantaneously the highest efficiency is achieved in the thermodynamic cycle. In particular, a mixture suitable for a Kalina cycle may be used, e.g. an ammonia-water mixture. To separate cooling agent mixtures again, where required, in this case a separator stage is provided in the condenser 38.

Instead of the solar panels, other means for thermal energy supply from regenerative heat sources (e.g. thermal spring) may also be used. Furthermore, the otherwise unutilized waste heat of technical apparatus or systems may be exploited by means of suitable heat exchangers 34.

Using the measures described above, a constant total efficiency of $\eta_{total}$, >15% should be achievable for the conversion of the thermal energy into electrical power.

The transformation of the irregular voltage pulses generated by the linear generator 18 into an alternating voltage suitable for feeding into an electric power grid is effected in that each individual voltage pulse is directly transformed into a grid-synchronous alternating voltage. To this end, provision is made for a direct coupling of the output of the linear generator 18 to the input of an inverter 54. (In FIG. 1 an additional filter and rectifier unit 56 is indicated between the linear generator 18 and the inverter 54, which is employed in an alternative embodiment to be discussed later.) This type of transformation requires:

1. The voltage pulses are (distinctly) longer than the reciprocal of the mains frequency to be generated and are in a voltage range required by the inverter 54 as the input voltage.

2. The electric power grid to be fed must be able to take up sporadically generated mains power. In its simple form, this type of voltage transformation is therefore not suitable for self-contained power supply systems.

Even in case of a rapidly varying input power, the employed inverter 54 generates, in a wide input voltage range, an output power having a constant grid-synchronous alternating voltage at a high efficiency. When there is no or too low an input voltage, the inverter 54 discontinues the transformation. As soon as the input voltage has exceeded a threshold value again, the inverter 54 continues its work and immediately feeds the grid-synchronous alternating voltage (at low losses) into the grid again.

According to a further development of this aspect, idle times of a generator or fluctuations in feeding into the grid may be at least partially compensated for by an arrangement of several generators having working strokes offset in time. The generators may either each be connected in parallel to an inverter to form generator/inverter pairs or may all be coupled to the same inverter at low cost, which, however, leads to a lower efficiency.

According to the embodiment illustrated in FIG. 1, at the output of the linear generator 18 a number of voltage pulses are emitted per unit of time, dependent on the currently prevailing power throughput. The output of the linear generator 18 is coupled to the input of an inverter 54 by means of a filter and rectifier unit 56 which converts the pulses into direct voltage usable for the inverter 54. The output of the inverter 54 is coupled to the electric power grid to be fed, so that the inverter 54 continuously transforms into an alternating voltage suitable for feeding into the electric power grid.

Even in case of a "low energy throughput", a continuous conversion of thermal energy into an alternating voltage suitable for feeding into the electric power grid takes place. The efficiency of the conversion depends only on the temperature levels of the thermodynamic cycle (preferably an ORC cycle), but not on the quantities of heat converted per unit of time. The filter and rectifier unit 56, which converts the pulses into direct voltage usable for the inverter 54, is dimensioned such that, even in case of the required minimum energy throughputs, it converts the resultant low frequency of voltage pulses into a direct voltage level which the inverter 54 can transform into an alternating voltage suitable for feeding into the electric power grid without any further significant losses or interruptions.

Figure 4:
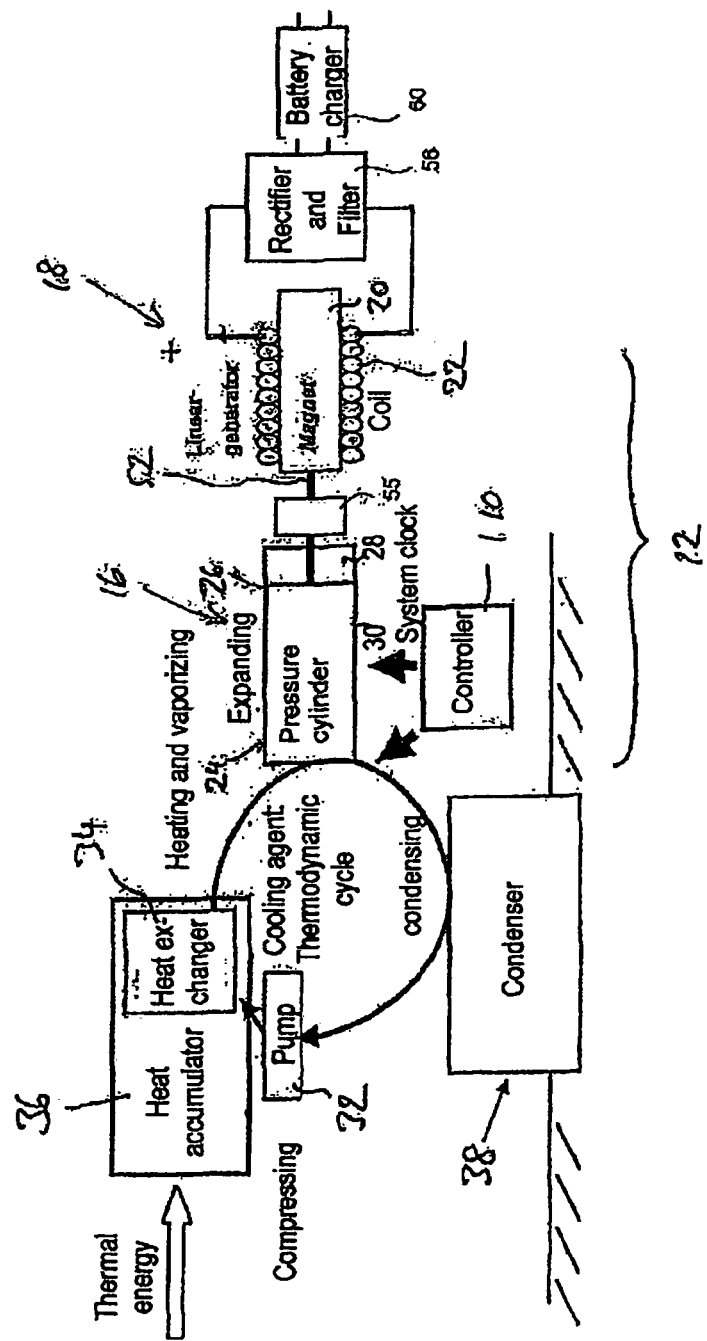
FIG. 4 illustrates a schematic structure of a system for generating electric power according to an embodiment of the present general inventive concept.

A different application of the present general inventive concept is illustrated in FIG. 4. In this case, the linear generator 18 is not coupled to an inverter for an electric power grid, but to a generator of suitable battery charging voltages and currents (battery charger) 60, e.g., for lithium-ion or nickel-cadmium batteries for automobiles.

It is further possible to couple the linear generator 18 to a voltage generator in order to thus perform an electrolysis for the release of hydrogen.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

The invention claimed is:

1. A system for generating electric power, comprising a device for converting thermodynamic energy into electrical energy, which comprises:
   a piston/cylinder unit which includes a pressure cylinder and a piston that is arranged in the pressure cylinder and is linearly movable by a change in volume of a working medium;
   a generator which includes a magnet and a coil, the magnet or the coil being coupled to the piston such that a linear movement of the piston affects a linear movement of the magnet relative to the coil;
   a component that measures at least one process parameter; and
   a controller which controls the working stroke of the device as a function of at least one measured process parameter;
   and further comprising a thermodynamic device connected upstream for converting thermal energy into mechanical energy of motion, which comprises:
   a working medium,
   a first, higher temperature heat reservoir, in which the working medium is heated by supplying thermal energy and experiences an expansion in volume,
   a second, lower temperature heat reservoir, in which the working medium is cooled down and experiences a contraction in volume, the expanding working medium being supplied to the piston/cylinder unit and the controller controlling the supply of the working medium to the piston/cylinder unit as a function of the at least one measured process parameter,
   at least one sensor for obtaining sensor data,
   wherein the controller evaluates sensor data and automatically arranges for the adjustment of filling levels and/or velocities of flow of the working medium in dependence on a maximum efficiency achievable based on the sensor data, and
   wherein the piston/cylinder unit includes a working chamber which is adjacent to the piston and is connected to the first and second heat reservoirs, respectively, via a pair of ducts having ports, and wherein intake and outlet volume of the working chamber is controlled via the ports which are adapted to be selectively opened and closed by the controller based on an evaluation of the sensor data indicating a maximum achievable efficiency.

2. The system according to claim 1, wherein the piston is moved by the working medium flowing into the working chamber of the pressure cylinder, and the controller determines the start and the duration of the inflow.

3. The system according to claim 1, wherein the controller initiates a working stroke only when the process parameter satisfies a predefined criterion.

4. The system according to claim 1, wherein the magnet is connected to the piston by a rigid rod.

5. The system according to claim 1, wherein the magnet is connected to the piston by a joint capable of absorbing transverse forces.

6. The system according to claim 1, wherein, for each working stroke of the device, the controller adjusts the volume of the working medium flowing into the working chamber of the pressure cylinder in dependence on the available pressure of the working medium for an optimum utilization of the maximum working chamber volume and for minimization of the pressure of the working medium after the expansion in volume.

7. The system according to claim 1, wherein the working medium has a lower boiling point than water and the working medium vaporizes in the first heat reservoir and condenses in the second heat reservoir.

8. The system according to claim 7, wherein the working medium is an ORC process medium.

9. The system according to claim 1, wherein a specific working medium or a mixture of a plurality of available working media having different boiling temperatures is selected as a function of the thermal energy supplied.

10. The system according to claim 1, further comprising:
    a device connected downstream to feed electrical energy into an electric power grid.

11. The system according to claim 1, further comprising:
    a device connected downstream to feed electrical energy into a generator of battery charging voltages and currents, in particular for lithium-ion batteries for automobiles.

12. The system according to claim 1, further comprising:
    a device connected downstream to feed electrical energy into a generator of voltages for an electrolysis for the release of hydrogen.

13. The system according to claim 8, wherein the working medium is R245fa.

14. The system according to claim 1, further comprising:
    a device connected downstream to feed electrical energy into a lithium-ion battery charger or a nickel-cadmium battery charger.

15. The system according to claim 1, wherein each working stroke is only initiated if a specific predetermined criteria is achieved.

16. The system according to claim 15, wherein the specific predetermined criteria comprises a sufficient pressure of the working medium.

17. The system according to claim 1, wherein each working stroke is independently controlled by the controller.

18. A system for generating electric power, comprising a device for converting thermodynamic energy into electrical energy, which comprises:

a piston/cylinder unit which includes a pressure cylinder and a piston that is arranged in the pressure cylinder and is linearly movable by a change in volume of a working medium;

a generator which includes a magnet and a coil, the magnet or the coil being coupled to the piston such that a linear movement of the piston affects a linear movement of the magnet relative to the coil;

a component that measures at least one process parameter; and a controller which controls the working stroke of the device as a function of at least one measured process parameter;

and further comprising a thermodynamic device connected upstream for converting thermal energy into mechanical energy of motion, which comprises:

a working medium, a first, higher temperature heat reservoir, in which the working medium is heated by supplying thermal energy and experiences an expansion in volume, a second, lower temperature heat reservoir, in which the working medium is cooled down and experiences a contraction in volume, the expanding working medium being supplied to the piston/cylinder unit and the controller controlling the supply of the working medium to the piston/cylinder unit as a function of the at least one measured process parameter, at least one sensor for obtaining sensor data, wherein the controller evaluates sensor data and automatically arranges for the adjustment of filling levels and/or velocities of flow of the working medium in dependence on a maximum efficiency achievable based on the sensor data, and wherein the system comprises a single piston system.

19. A system for generating electric power, comprising a device for converting thermodynamic energy into electrical energy, which comprises:

a piston/cylinder unit which includes a pressure cylinder and a piston that is arranged in the pressure cylinder and is linearly movable by a change in volume of a working medium;

a generator which includes a magnet and a coil, the magnet or the coil being coupled to the piston such that a linear movement of the piston affects a linear movement of the magnet relative to the coil;

a component that measures at least one process parameter; and a controller which controls the working stroke of the device as a function of at least one measured process parameter;

and further comprising a thermodynamic device connected upstream for converting thermal energy into mechanical energy of motion, which comprises:

a working medium, a first, higher temperature heat reservoir, in which the working medium is heated by supplying thermal energy and experiences an expansion in volume, a second, lower temperature heat reservoir, in which the working medium is cooled down and experiences a contraction in volume, the expanding working medium being supplied to the piston/cylinder unit and the controller controlling the supply of the working medium to the piston/cylinder unit as a function of the at least one measured process parameter, wherein heating and cooling of the working medium is performed external of the piston/cylinder unit, at least one sensor for obtaining sensor data, and wherein the controller evaluates sensor data and automatically arranges for the adjustment of filling levels and/or velocities of flow of the working medium in dependence on a maximum efficiency achievable based on the sensor data.

20. A system for generating electric power, comprising a device for converting thermodynamic energy into electrical energy, which comprises:

a piston/cylinder unit which includes a pressure cylinder and a piston that is arranged in the pressure cylinder and is linearly movable by a change in volume of a working medium;

a generator which includes a magnet and a coil, the magnet or the coil being coupled to the piston such that a linear movement of the piston affects a linear movement of the magnet relative to the coil;

a component that measures at least one process parameter; and a controller which controls the working stroke of the device as a function of at least one measured process parameter, the controller initiating a control sequence of individual working strokes allowing each working stroke to proceed with optimum energy conversion;

and further comprising a thermodynamic device connected upstream for converting thermal energy into mechanical energy of motion, which comprises:

a working medium, a first, higher temperature heat reservoir, in which the working medium is heated by supplying thermal energy and experiences an expansion in volume, a second, lower temperature heat reservoir, in which the working medium is cooled down and experiences a contraction in volume, the expanding working medium being supplied to the piston/cylinder unit and the controller controlling the supply of the working medium to the piston/cylinder unit as a function of the at least one measured process parameter, at least one sensor for obtaining sensor data, and wherein the controller evaluates sensor data and automatically arranges for the adjustment of filling levels and/or velocities of flow of the working medium in dependence on a maximum efficiency achievable based on the sensor data.

* * * * *